US006601210B1

(12) United States Patent
Kagan

(10) Patent No.: US 6,601,210 B1
(45) Date of Patent: Jul. 29, 2003

(54) DATA INTEGRITY VERIFICATION IN A SWITCHING NETWORK

(75) Inventor: Michael Kagan, Zichron Yaakov (IL)

(73) Assignee: Mellanox Technologies, LTD (IL)

( * ) Notice: Subject to any disclaimer, the term of this patent is extended or adjusted under 35 U.S.C. 154(b) by 336 days.

(21) Appl. No.: 09/614,629

(22) Filed: Jul. 12, 2000

Related U.S. Application Data

(60) Provisional application No. 60/152,849, filed on Sep. 8, 1999.

(51) Int. Cl.[7] .......................... G01R 31/28; H03M 13/00
(52) U.S. Cl. ........................................ 714/758; 714/799
(58) Field of Search ................................ 714/712, 715, 714/819, 821, 746, 751, 752, 758, 774, 785, 793, 799, 43, 56, 48, 3, 4, 807, 703, 757, 800, 801, 811

(56) References Cited

U.S. PATENT DOCUMENTS

| | | | | |
|---|---|---|---|---|
| 5,390,197 A | * | 2/1995 | MacDonald et al. | ........ 714/758 |
| 5,461,629 A | | 10/1995 | Sutterlin et al. | |
| 5,703,887 A | | 12/1997 | Heegard et al. | |
| 5,734,826 A | * | 3/1998 | Olnowich et al. | .......... 370/410 |
| 5,802,080 A | * | 9/1998 | Westby | ........................ 714/712 |
| 5,954,835 A | * | 9/1999 | Higginson et al. | .......... 714/759 |
| 5,987,629 A | | 11/1999 | Sastry et al. | |
| 6,286,125 B1 | * | 9/2001 | Leshay et al. | ................. 714/56 |

* cited by examiner

*Primary Examiner*—Christine T. Tu
(74) *Attorney, Agent, or Firm*—Woodcock Washburn LLP

(57) ABSTRACT

A data transmission device includes input circuitry, configured to receive a block of data over a network, the block containing an error-checking code, the input circuitry including input error-checking logic, which is adapted to detect a discrepancy between the data and the error-checking code and to generate a first error signal indicating whether the discrepancy was detected in the input circuitry. The device also includes output circuitry, configured to transmit the block of data, received by the input circuitry, over the network, and including output error-checking logic, which is adapted to detect the discrepancy between the data and the error-checking code and to generate a second error signal indicating whether the discrepancy was detected in the output circuitry. A comparator is coupled to receive and compare the first and second error signals, so as to identify a source of the discrepancy.

13 Claims, 3 Drawing Sheets

DATA INTEGRITY VERIFICATION IN A SWITCHING NETWORK

This application claims the benefit of Provisional Application Ser. No. 60/152,849 filed Sep. 8, 1999.

FIELD OF THE INVENTION

The present invention relates generally to systems and methods for high-speed data transfer, and specifically to methods and devices for verifying the integrity of data and detecting data faults in such a system.

BACKGROUND OF THE INVENTION

Error-checking is an integral element of high-reliability data transfer systems. To ensure reliable operation, it is necessary to check all data and control paths for bit errors, which may occur due to noise, cosmic rays or other causes. One of the most common, standard methods for error checking is based on Cyclic Redundancy Codes (CRCs), which are computed by applying a predefined polynomial to each block of transmitted data. Typically, before sending a data packet over a network or other communication link, the transmitting device, such as a source node, computes the CRC for the bits in the packet and appends it to the packet. Upon receiving the packet, the receiving device recomputes the CRC and compares it to the transmitted CRC. A discrepancy indicates that an error has occurred.

In switch fabrics and other complex networks, it is generally desirable not only to detect erroneous packets, but also to determine at what point the error in the packet was introduced, in order to take remedial action. Since a packet typically makes multiple hops through the network between its source and its destination, multiple CRC checks are required. It is therefore necessary to check the CRC at every input of every device in the network. An approach of this sort has been adopted in the "InfiniBand" network architecture, which has been advanced by a consortium led by a group of industry leaders (including Intel, Sun, Hewlett Packard, IBM, Compaq, Dell and Microsoft). This approach does not provide a complete solution to the problem of error location, however, since the CRC check at the device input is incapable of distinguishing between network link errors and device errors that occurred in devices along the packet's path.

FIG. 1 is a block diagram that schematically illustrates a switching device 20, as is known in the art, offering a solution to the problem of error location. Device 20 comprises a plurality of input circuits 22 and output circuits 26, interconnected by a switching core 24. Each of the input circuits comprises a CRC checker 30, typically a logic circuit, which computes the CRC of the bits in each received packet and compares it to the CRC transmitted with the packet by the preceding device on the packet's route. In order to distinguish internal errors from external errors, a parity generator 32 computes a parity bit and attaches it to each unit of data to be conveyed through the device. The data, together with the associated parity bits, are then stored in a buffer 34 while awaiting the attention of switching core 24. Output circuits 26 may include additional or alternative data buffers, as is known in the art.

A parity checker 40 recomputes the parity of each data unit passed to output circuit 26 by switching core 24. A discrepancy in the parity bit indicates that an error has occurred in data storage or transfer within device 20. Routing logic 42 modifies the header of the data packet, typically in order to indicate the source and destination that the packet is to take over its next hop. A CRC calculator 44 computes a new CRC for the packet, reflecting the change in the packet header, and the packet is then transmitted to the next device over the network. The separation of CRC and parity functions enables device 20 to distinguish internal from external data errors. Addition of the parity bit, however, requires additional data lines and storage capacity inside the device. When the data unit size is one byte, this overhead is greater than 10%.

SUMMARY OF THE INVENTION

It is an object of the present invention to provide improved devices and methods for verifying data integrity in a data transmission system.

It is a further object of some aspects of the present invention to provide devices and methods for distinguishing between internal device errors and external link errors, with reduced overhead relative to approaches known in the art.

In preferred embodiments of the present invention, a switching device in a network comprises CRC checking logic both in its input circuits and in its output circuits. For each block of data passing through the device, typically in the form of a data packet, the CRC is thus checked twice: once as it enters the device and once before it exits. A discrepancy between the entry and exit CRCs indicates that a fault has occurred inside the device. Otherwise, when both the entry and exit CRCs are erroneous, the fault can be identified as having occurred in a link or other device before the packet reached the current device. Internal and external faults are thus distinguished without the added overhead of using a parity bit.

Preferably, when a CRC error is detected in a packet, the packet header information is reported to a network management entity, referred to herein as a fabric manager, together with an identification of the fault as internal or external. Alternatively, only internal errors, only external errors, or neither internal nor external errors are reported in this manner. The fabric manager uses the header information to identify the route that the packet has taken through the network, so as to diagnose the fault and to take corrective action as appropriate.

While preferred embodiments are described herein with reference to particular switching devices in packet-switched networks, the principles of the present invention are equally applicable to other types of data transmission devices and systems. Furthermore, although these embodiments are based on CRCs, other methods of error checking, as are known in the art, may similarly be used.

There is therefore provided, in accordance with a preferred embodiment of the present invention, a data transmission device, including:

input circuitry, configured to receive a block of data over a network, the block containing an error-checking code, the input circuitry including input error-checking logic, which is adapted to detect a discrepancy between the data and the error-checking code and to generate a first error signal indicating whether the discrepancy was detected in the input circuitry;

output circuitry, configured to transmit the block of data, received by the input circuitry, over the network, and including output error-checking logic, which is adapted to detect the discrepancy between the data and the error-checking code and to generate a second error signal indicating whether the discrepancy was detected in the output circuitry; and a comparator, coupled to receive and compare the first and second error signals, so as to identify a source of the discrepancy.

Preferably, the error-checking code includes a Cyclic Redundancy Code (CRC).

Further preferably, when the error signals indicate that the discrepancy was detected in the output circuitry but not the input circuitry, the comparator identifies the source of the discrepancy as being in the device. Most preferably, when the error signals indicate that the discrepancy was detected in both the input circuitry and the output circuitry, the comparator identifies the source of the discrepancy as being external to the device.

Preferably, the data block includes a packet including routing information, and the device includes a buffer, which is coupled to receive the routing information and to transfer the routing information to a processor responsive to one or more of the error signals.

In a preferred embodiment, the input and output circuitry respectively include multiple input and output ports, and the input and output error-checking logic include error checkers associated respectively with the multiple ports, and the device includes a switching core, coupled to transfer the block of data from one of the input ports that receives the block to a designated one of the output ports.

There is also provided, in accordance with a preferred embodiment of the present invention, a method for error detection in a device having an input and an output, including:

receiving a block of data at the input of the device, the block including an error-checking code;

checking the block so as to detect a discrepancy between the data at the input and the error-checking code;

generating a first error signal indicating whether the discrepancy was detected at the input;

conveying the data through the device;

checking the block after conveying the data through the device so as to detect the discrepancy between the data and the error-checking code at the output of the device;

generating a second error signal indicating whether the discrepancy was detected at the output; and comparing the first and second error signals so as to identify a source of the discrepancy.

Preferably, the data block includes a packet including routing information, and the method includes extracting the routing information responsive to one or more of the error signals. Most preferably, the device belongs to a network, and the method includes locating a fault in the network responsive to the one or more of the error signals and to the extracted routing information.

The present invention will be more fully understood from the following detailed description of the preferred embodiments thereof, taken together with the drawings in which:

DETAILED DESCRIPTION OF A PREFERRED EMBODIMENT

Figure 1:
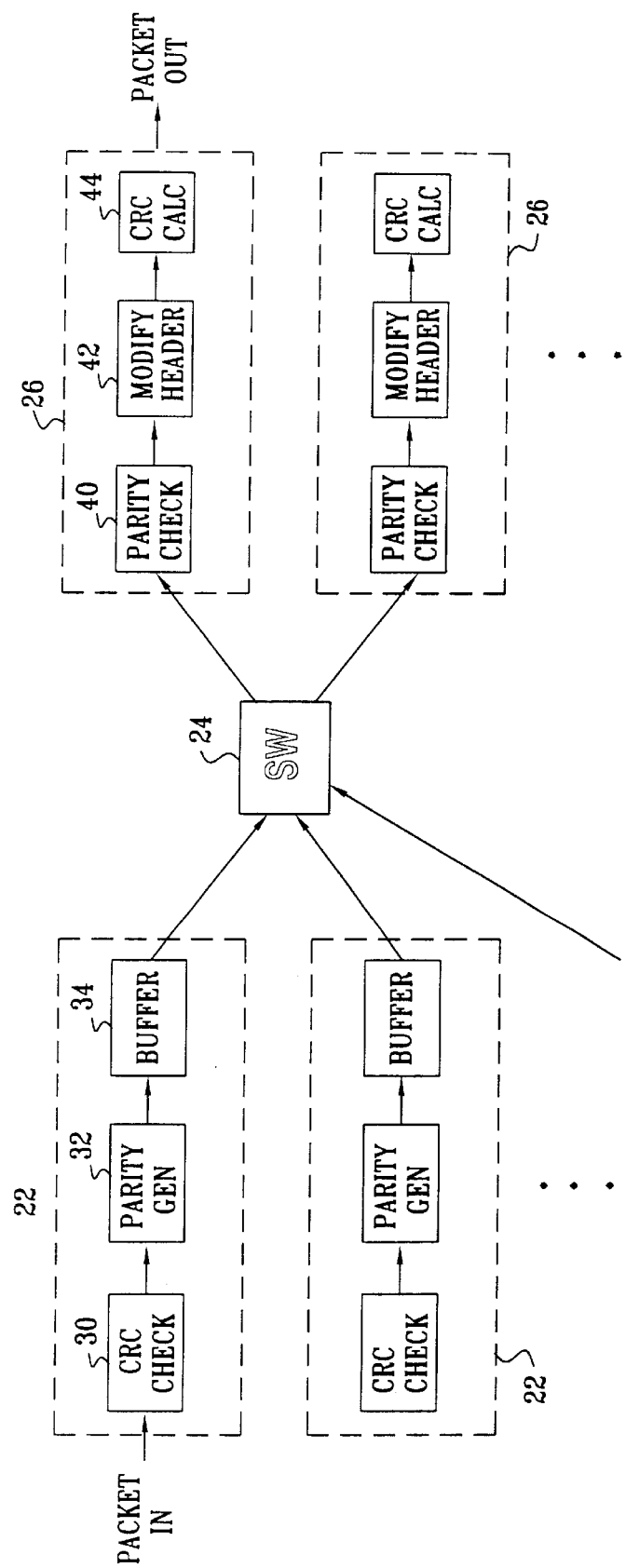
FIG. 1 is a block diagram that schematically illustrates a switching device with error detection capabilities, as is known in the art.
Figure 2:
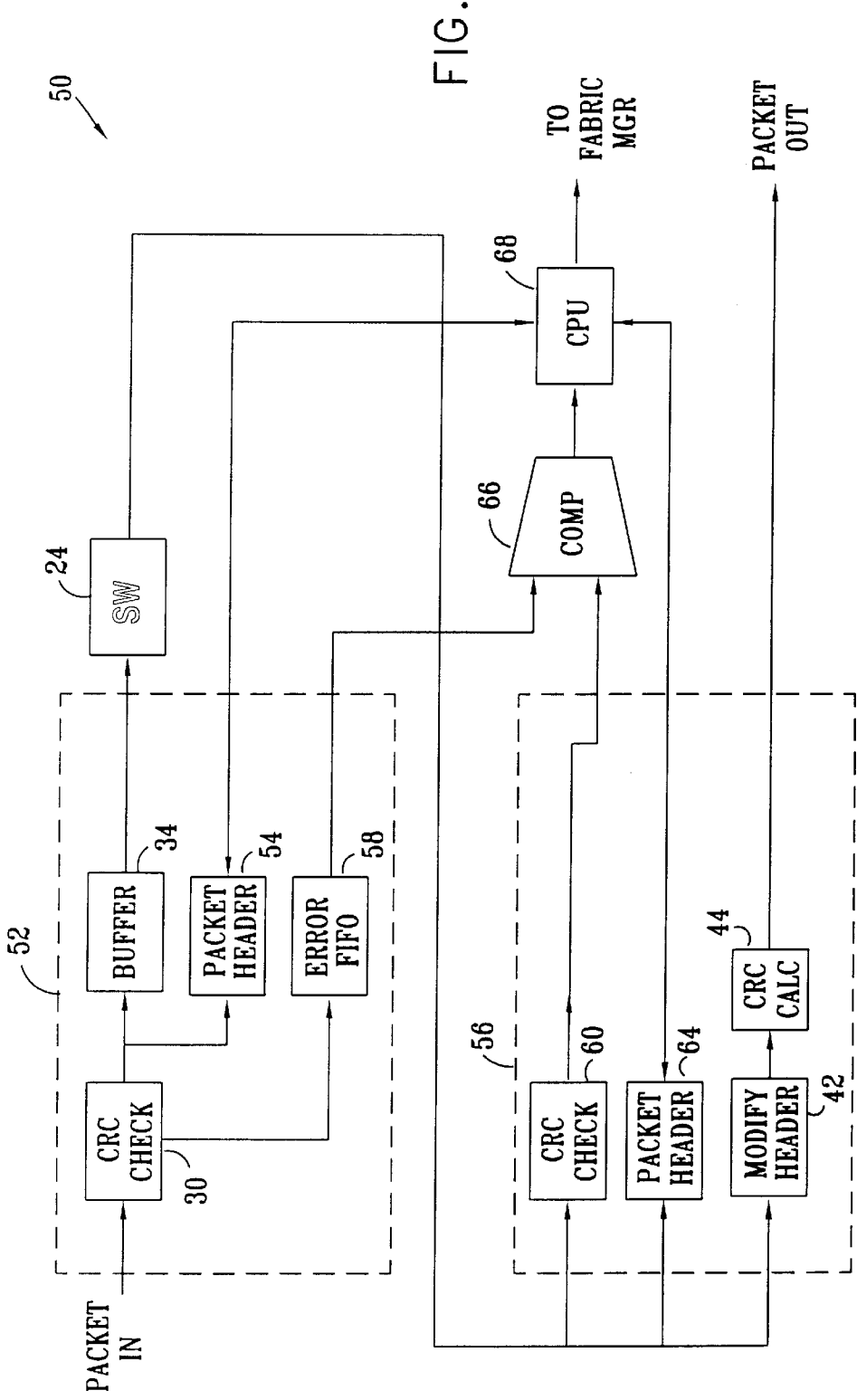
FIG. 2 is a block diagram that schematically illustrates elements of a switching device with error detection capabilities, in accordance with a preferred embodiment of the present invention.

Reference is now made to FIG. 2, which is a block diagram that schematically illustrates elements of a switching device 50, in accordance with a preferred embodiment of the present invention. Device 50 comprises input circuits 52 and output circuits 56, linked by switching core 24 as in FIG. 1. Preferably, device 50 is a switch in a network, most preferably in a switching fabric, such as an InfiniBand fabric. Thus, device 50 typically comprises multiple inputs and outputs, like device 20 shown in FIG. 1; but for the sake of simplicity of illustration, only one input circuit 52 and one output circuit 56 are shown in FIG. 2.

CRC checker 30 checks packets received by input circuits 52 of device 50. For each packet, the CRC checker generates an error signal, preferably by attaching an error bit to the packet. This action is schematically equivalent to placing an appropriate error bit in a first-in-first-out (FIFO) register 58, as shown in FIG. 2. The value of the error bit indicates whether the CRC code matched the data in the packet or not, with the value "1" indicating that a discrepancy was detected, for example. The packets are placed in buffer 34 to await transfer to the output circuits by switching core 24, and the packet headers are held in a header buffer 54 for later reference. Preferably, device 50 is configured for high-speed operation, wherein the switching core may begin transferring the packet to output circuits 56 even before the CRC check is completed.

Packets received by the output circuits are passed to routing circuitry 42 and CRC calculator 44, for transmission to the next element in the switching fabric. At the same time, the packets are again checked for CRC errors by a second CRC checker 60. Error bits generated by checker 60 are passed to a comparator 66, which compares the error bit from checker 60 to the corresponding error bit stored in FIFO 58 for each of the packets passed from input circuits 52 to output circuits 56. When predetermined error conditions occur, such as when CRC checker 60 detects an error in a packet that was not detected by CRC checker 30, comparator 66 preferably generates an interrupt to a central processing unit (CPU) 68. Output circuits 56 also comprise a packet header buffer 64, which is read by the CPU in order to find the source of the erroneous packet. Although comparator 66 is shown in FIG. 2 as a separate element from CPU 68, the function of the comparator may also be carried out by a software process running on the CPU, depending on considerations of design convenience and processing speed needed to carry out this function. Alternatively or additionally, an identification of the error source (internal or external) is held in a status register (not shown), where it can be accessed either by CPU 68 or by a processor external to device 50 or by both.

Figure 3:
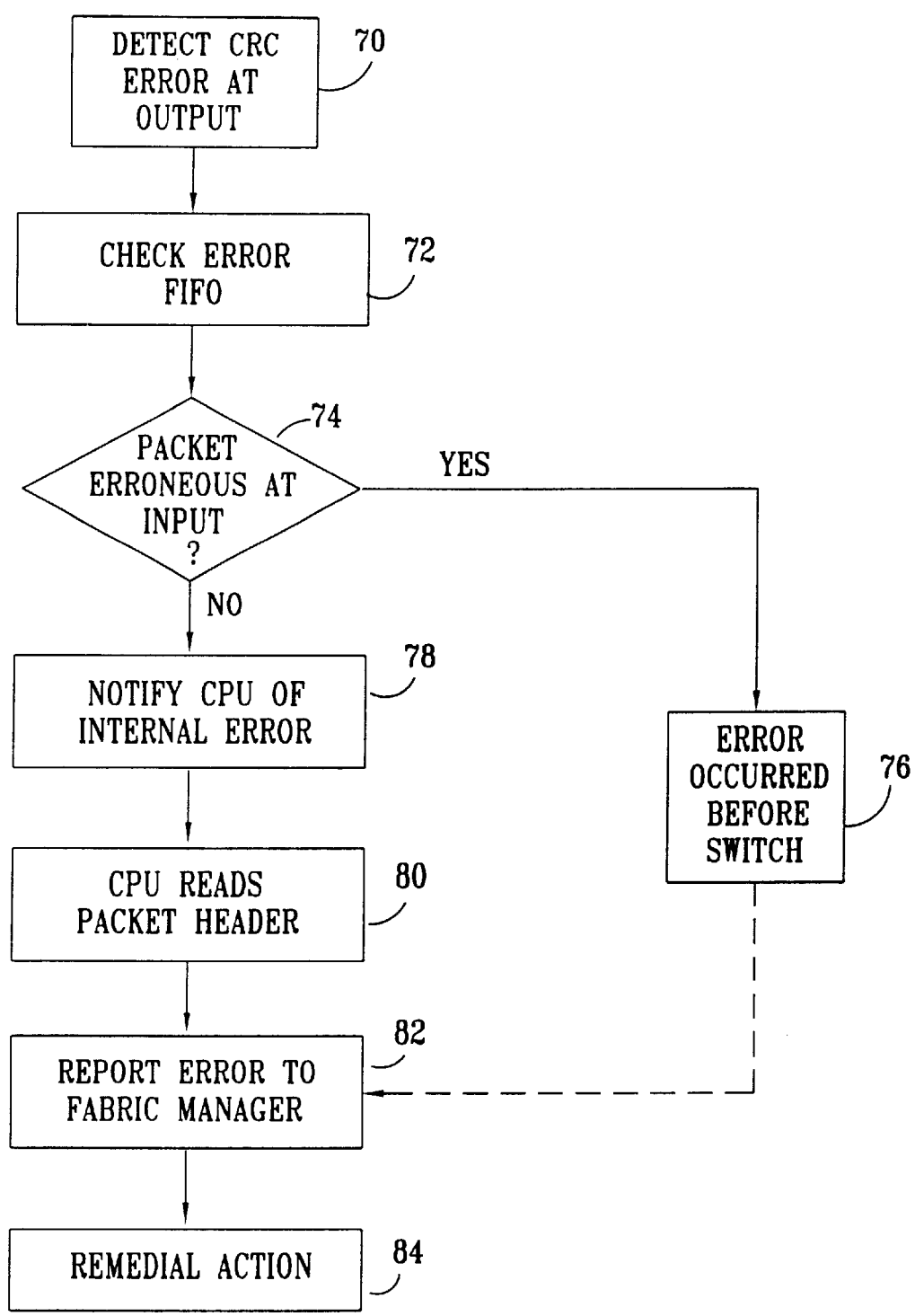
FIG. 3 is a flow chart that schematically illustrates a method of error detection and diagnosis, in accordance with a preferred embodiment of the present invention.

FIG. 3 is a flow chart that schematically illustrates a method for detecting and diagnosing errors in device 50, in accordance with a preferred embodiment of the present invention. The method is initiated when CRC checker 60 reports to comparator 66 that an error has been detected in a packet in output circuits 56, at an error detection step 70. The comparator then checks the error bit corresponding generated by CRC checker 30, at an error checking step 72. The error bit from checker 30 indicates, at a decision step 74, whether the fault that gave rise to the CRC error occurred in device 50 or along the path of the packet through the fabric (or other network) before it reached device 50. If this error bit indicates that CRC checker 30 also detected an error in this packet, then the comparator determines that the error occurred before the packet reached device 50, at a prior error step 76. On the other hand, when the error bit indicates that CRC checker 30 found no prior error in this packet, the comparator notifies the CPU that a possible fault has occurred in device 50, at an internal error step 78.

When a possible fault is detected in device 50, CPU 68 preferably halts the normal operation of the device while it collects diagnostic information and decides how to proceed. While the operation is halted, the CPU reads the header information of the faulty packet from buffer 54 and/or 64, at a header reading step 80. (Because the error detection and error handling process runs in parallel with normal switching operation of device 50, the header information may have already been flushed from buffer 54 and may be available only in buffer 64. On the other hand, if the error is detected by CRC checker 30 before the packet was switched through to output circuits 56, the packet is typically discarded by input circuits 52, so that the header information never reaches buffer 64.) After receiving all of the necessary error information, the CPU may once again allow the device to continue operating. At a reporting step 82, the CPU preferably informs a processor or other network management entity, such as an InfiniBand fabric manager, of the details of the detected fault in device 50. Optionally, the fabric manager is also informed when an error prior to device 50 was detected at step 76.

Based on the error report from the CPU, the fabric manager diagnoses the fault and, as appropriate, initiates corrective measures, at a remedial action step 84. The header information reported by the CPU enables the fabric manager to determine the route that the packet took through the network, and hence through device 50, so that the location of the fault can be found. The fabric manager is thus able to distinguish device errors from faults occurring in network links between the devices. The corrective measures typically include shutting down a faulty link or a faulty device and rerouting network traffic around the faulty element. Preferably, the fabric manager generates an alarm or otherwise notifies an operator of the network that the fault has occurred.

While the preferred embodiment described with reference to FIGS. 2 and 3 is built around a particular switching device in a packet-switched fabric, the principles of the present invention are equally applicable to other types of data transmission devices and systems. Furthermore, although this embodiment makes use of CRCs, other methods of error checking, as are known in the art, may similarly be used. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A data transmission device, comprising:

input circuitry, configured to receive a block of data over a network, the block containing an error-checking code, the input circuitry comprising input error-checking logic, which is adapted to detect a discrepancy between the data and the error-checking code and to generate a first error signal indicating whether the discrepancy was detected in the input circuitry;

output circuitry, configured to transmit the block of data, received by the input circuitry, over the network, and comprising output error-checking logic, which is adapted to detect the discrepancy between the data and the error-checking code and to generate a second error signal indicating whether the discrepancy was detected in the output circuitry; and a comparator, coupled to receive and compare the first and second error signals, so as to identify a source of the discrepancy.

2. A device according to claim 1, wherein the error-checking code comprises a Cyclic Redundancy Code (CRC).

3. A device according to claim 1, wherein the data block comprises a packet including routing information, and wherein the device comprises a buffer, which is coupled to receive the routing information and to transfer the routing information to a processor responsive to one or more of the error signals.

4. A device according to claim 1, wherein the input and output circuitry respectively comprise multiple input and output ports, and wherein the input and output error-checking logic comprise error checkers associated respectively with the multiple ports, and wherein the device comprises a switching core, coupled to transfer the block of data from one of the input ports that receives the block to a designated one of the output ports.

5. A data transmission device, comprising:

input circuitry, configured to receive a block of data over a network, the block containing an error-checking code, the input circuitry comprising input error-checking logic, which is adapted to detect a discrepancy between the data and the error-checking code and to generate a first error signal indicating whether the discrepancy was detected in the input circuitry;

output circuitry, configured to transmit the block of data, received by the input circuitry, over the network, and comprising output error-checking logic, which is adapted to detect the discrepancy between the data and the error-checking code and to generate a second error signal indicating whether the discrepancy was detected in the output circuitry; and a comparator, coupled to receive and compare the first and second error signals, so as to identify a source of the discrepancy, wherein when the error signals indicate that the discrepancy was detected in the output circuitry but not the input circuitry, the comparator identifies the source of the discrepancy as being in the device.

6. A device according to claim 5, wherein when the error signals indicate that the discrepancy was detected in both the input circuitry and the output circuitry, the comparator identifies the source of the discrepancy as being external to the device.

7. A method for error detection in a device having an input and an output, comprising:

receiving a block of data at the input of the device, the block including an error-checking code;

checking the block so as to detect a discrepancy between the data at the input and the error-checking code;

generating a first error signal indicating whether the discrepancy was detected at the input;

conveying the data through the device;

checking the block after conveying the data through the device so as to detect the discrepancy between the data and the error-checking code at the output of the device;

generating a second error signal indicating whether the discrepancy was detected at the output; and comparing the first and second error signals so as to identify a source of the discrepancy.

8. A method according to claim 7, wherein the error-checking code comprises a Cyclic Redundancy Code (CRC).

9. A method according to claim 7, wherein the data block comprises a packet including routing information, and wherein the method comprises extracting the routing information responsive to one or more of the error signals.

10. A method according to claim 9, wherein the device belongs to a network, and wherein the method comprises locating a fault in the network responsive to the one or more of the error signals and to the extracted routing information.

11. A method according to claim 7, wherein the input and the output of the device comprise multiple inputs and outputs, and wherein conveying the data through the device comprises switching the block of data from one of the inputs to a designated one of the outputs.

12. A method for error detection in a device having an input and an output, comprising:

receiving a block of data at the input of the device, the block including an error-checking code;

checking the block so as to detect a discrepancy between the data at the input and the error-checking code;

generating a first error signal indicating whether the discrepancy was detected at the input;

conveying the data through the device;

checking the block after conveying the data through the device so as to detect the discrepancy between the data and the error-checking code at the output of the device;

generating a second error signal indicating whether the discrepancy was detected at the output; and comparing the first and second error signals so as to identify a source of the discrepancy, wherein comparing the first and second error signals comprises identifying the source of the discrepancy as being in the device when the error signals indicate that the discrepancy was detected at the output but not at the input.

13. A method according to claim 12, wherein comparing the first and second error signals comprises identifying the source of the discrepancy as being external to the device when the error signals indicate that the discrepancy was detected at both the output and the input.

* * * * *